United States Patent
Abdulwaheed

(10) Patent No.: US 10,547,780 B2
(45) Date of Patent: Jan. 28, 2020

(54) BODY PART COLOR MEASUREMENT DETECTION AND METHOD

(71) Applicant: Abdul Abdulwaheed, Quincy, WA (US)

(72) Inventor: Abdul Abdulwaheed, Quincy, WA (US)

(*) Notice: Subject to any disclaimer, the term of this patent is extended or adjusted under 35 U.S.C. 154(b) by 0 days.

(21) Appl. No.: 15/978,313

(22) Filed: May 14, 2018

(65) Prior Publication Data
US 2019/0349518 A1    Nov. 14, 2019

(51) Int. Cl.
G06K 9/00    (2006.01)
H04N 5/232   (2006.01)
G06T 7/90    (2017.01)
H04N 5/272   (2006.01)

(52) U.S. Cl.
CPC ..... H04N 5/23222 (2013.01); G06K 9/00664 (2013.01); G06T 7/90 (2017.01); H04N 5/232935 (2018.08); H04N 5/272 (2013.01); G06T 2207/10024 (2013.01); G06T 2207/30036 (2013.01)

(58) Field of Classification Search
CPC ............... H04N 5/23222; H04N 5/272; H04N 5/232935; G06K 9/00664; G06T 7/90; G06T 2207/10024; G06T 2207/30036
See application file for complete search history.

(56) References Cited

U.S. PATENT DOCUMENTS

| | | |
|---|---|---|
| 5,798,839 A | 8/1998 | Berner et al. |
| 6,038,024 A | 3/2000 | Berner |
| 6,190,170 B1 | 2/2001 | Morris et al. |
| 6,358,047 B2 | 3/2002 | Lehmann |
| 7,064,830 B2 | 6/2006 | Giorgianni et al. |
| 7,312,874 B2 | 12/2007 | Berner |
| 7,463,757 B2 | 12/2008 | Luo et al. |
| 8,316,052 B2 | 11/2012 | Hao et al. |
| 9,478,043 B2 | 10/2016 | Abdulwaheed |

(Continued)

FOREIGN PATENT DOCUMENTS

WO    2012038474 A1    3/2012

OTHER PUBLICATIONS

Feb. 15, 2018 USPTO Office Action (U.S. Appl. No. 15/296,360).

(Continued)

Primary Examiner — John B Strege
(74) Attorney, Agent, or Firm — Tysver Beck Evans, PLLC

(57) ABSTRACT

Providing a color score for a user's teeth using a smartphone is presented. The phone includes an application electronically stored therein and accessed using the user interface screen. To acquire the score the app prompts the user to turn the phone upside down and enter a darkened room, then it illuminate a portion of the display to provide illumination of a set color temperature. Then, using the camera function, graphical enhancements and prompts provided by the application, an image of the user's face and specifically their exposed front teeth is acquired. The application prompts the user to outline an area of their teeth in the image to acquire a pixel count area. The area is sent to an external server where the area is analyzed and a color score calculated. The color score is sent back to the phone for display.

4 Claims, 14 Drawing Sheets

(56) References Cited

U.S. PATENT DOCUMENTS

| | | | |
|---|---|---|---|
| 2002/0048400 A1 | 4/2002 | Leedham et al. | |
| 2003/0179392 A1 | 9/2003 | Weldy | |
| 2006/0152586 A1 | 7/2006 | Komiya et al. | |
| 2007/0255589 A1 | 11/2007 | Rodriguez | |
| 2008/0253651 A1 | 10/2008 | Sagawa | |
| 2008/0270175 A1 | 10/2008 | Rodriguez et al. | |
| 2008/0310712 A1 | 12/2008 | Edgar | |
| 2009/0181339 A1 | 7/2009 | Liang et al. | |
| 2010/0284616 A1 | 11/2010 | Dalton et al. | |
| 2010/0303315 A1* | 12/2010 | Rohner | G01J 3/02 382/128 |
| 2012/0156634 A1 | 6/2012 | Duff, Jr. et al. | |
| 2013/0015946 A1* | 1/2013 | Lau | G07C 9/00 340/5.2 |
| 2013/0129642 A1 | 5/2013 | Joiner et al. | |
| 2013/0244197 A1 | 9/2013 | Tjioe et al. | |
| 2014/0146142 A1 | 5/2014 | Duret et al. | |
| 2014/0330577 A1 | 11/2014 | Herman et al. | |
| 2017/0228986 A1 | 8/2017 | Amone et al. | |

OTHER PUBLICATIONS

Apr. 24, 2017 USPTO Office Action (U.S. Appl. No. 15/296,360).
May 31, 2016 USPTO Office Action (U.S. Appl. No. 14/607,652).
Sep. 20, 2017 USPTO Office Action (U.S. Appl. No. 15/296,360).

\* cited by examiner

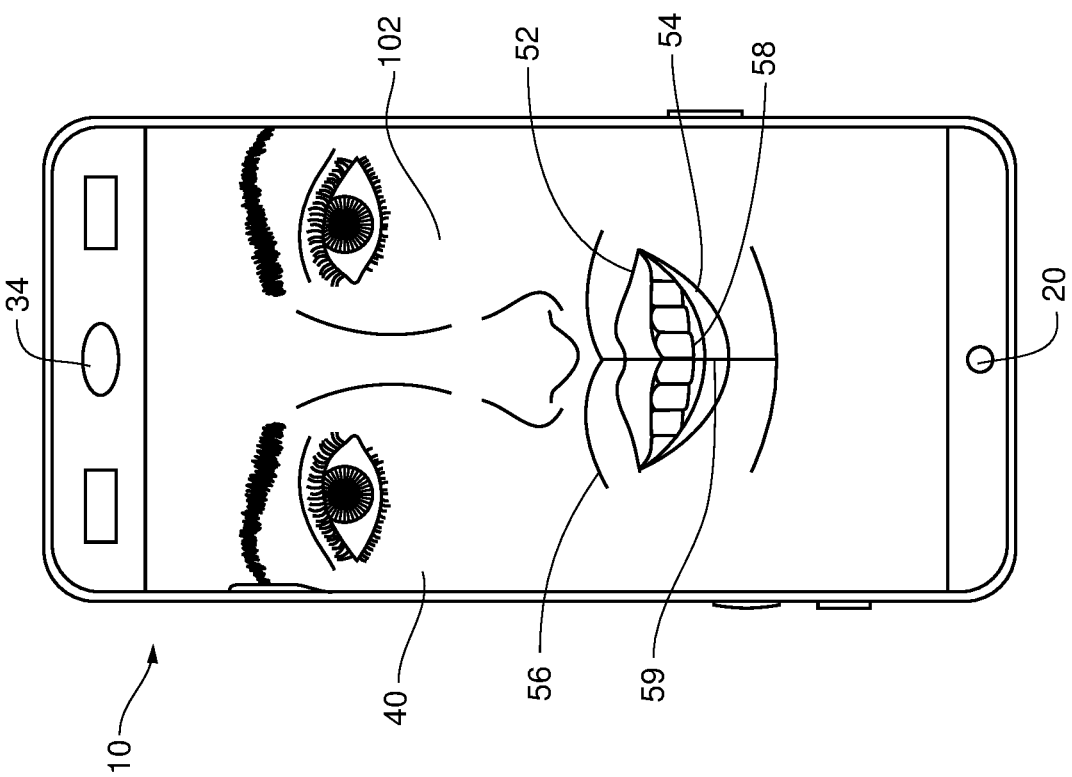
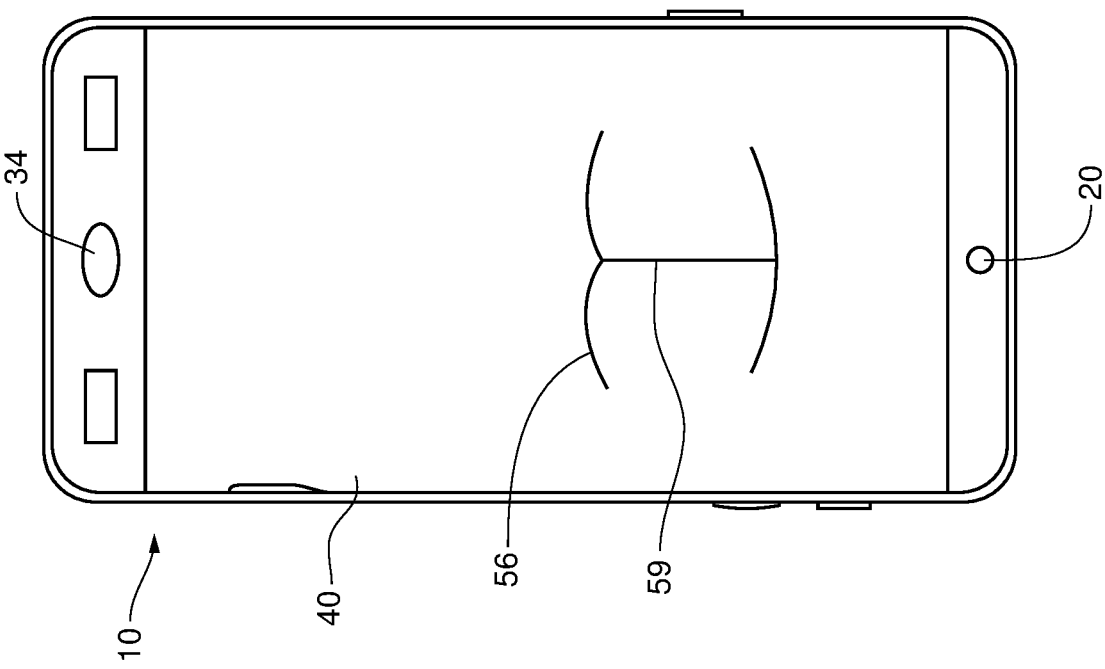

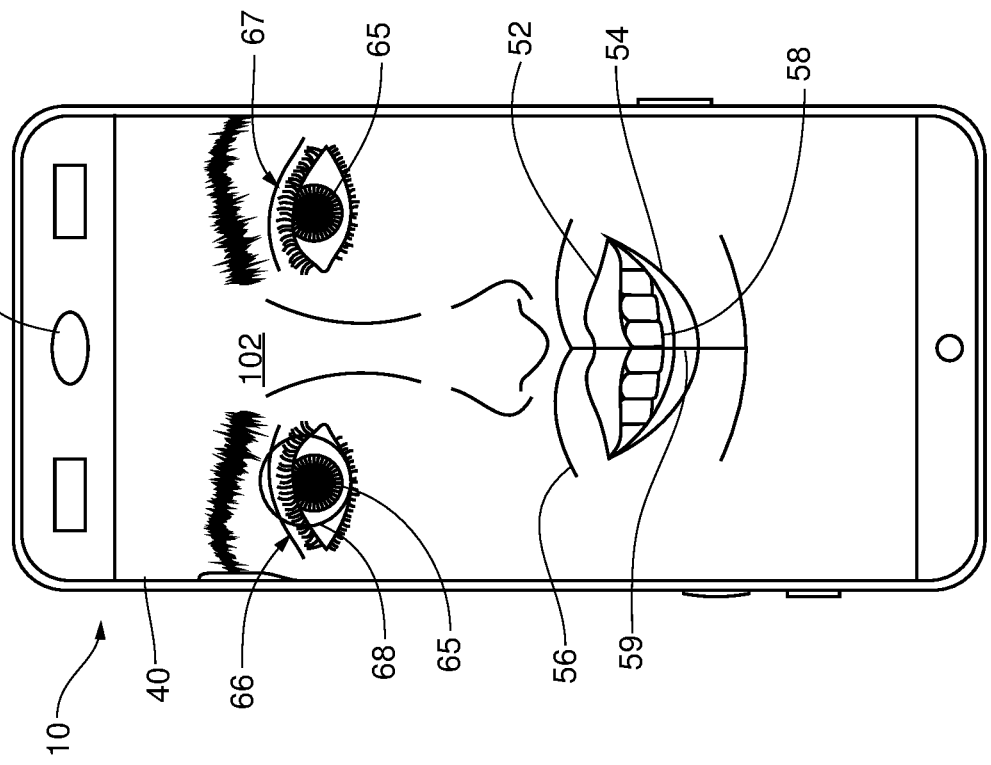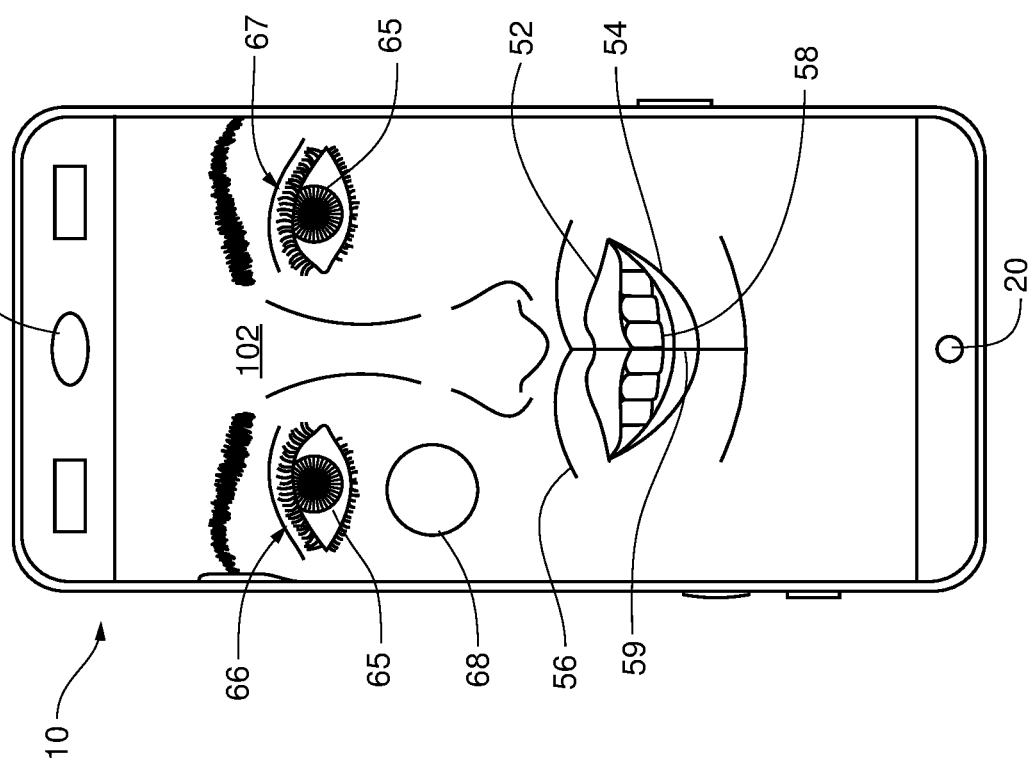

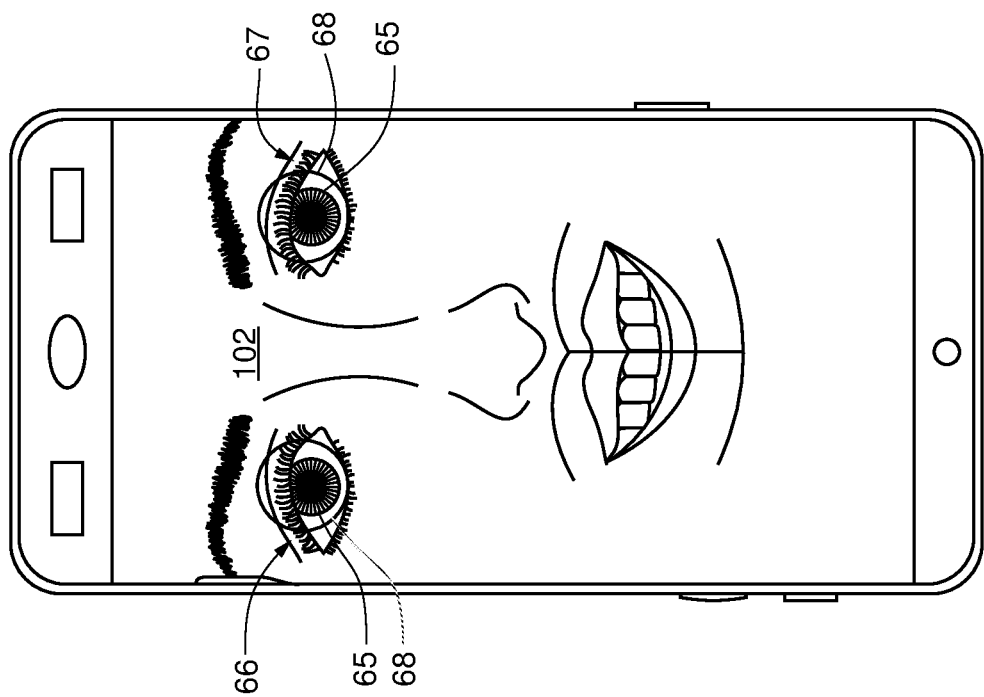
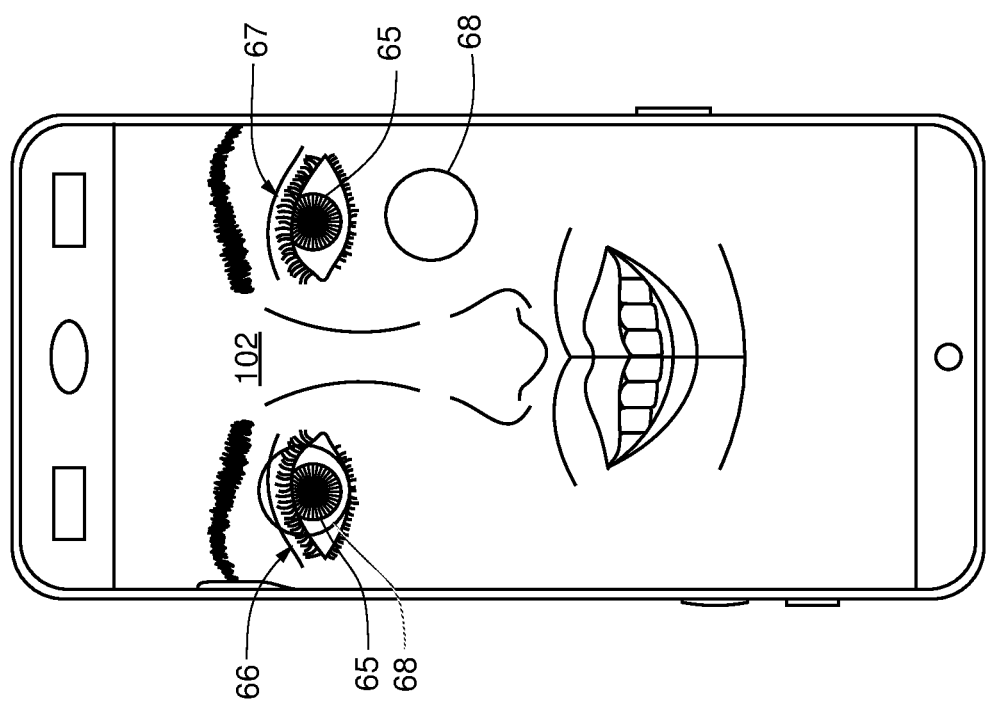

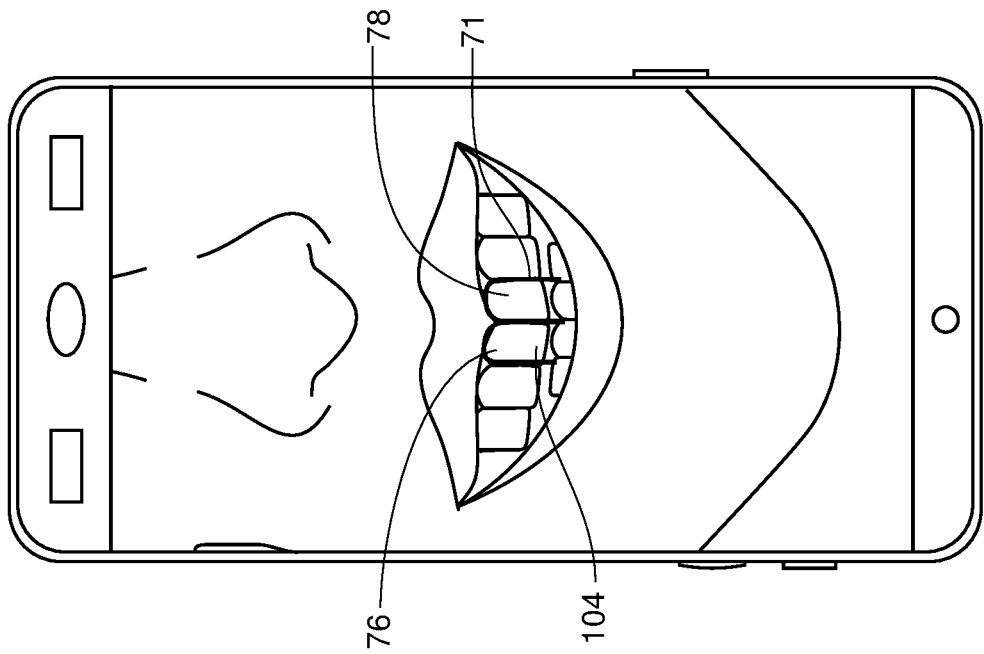
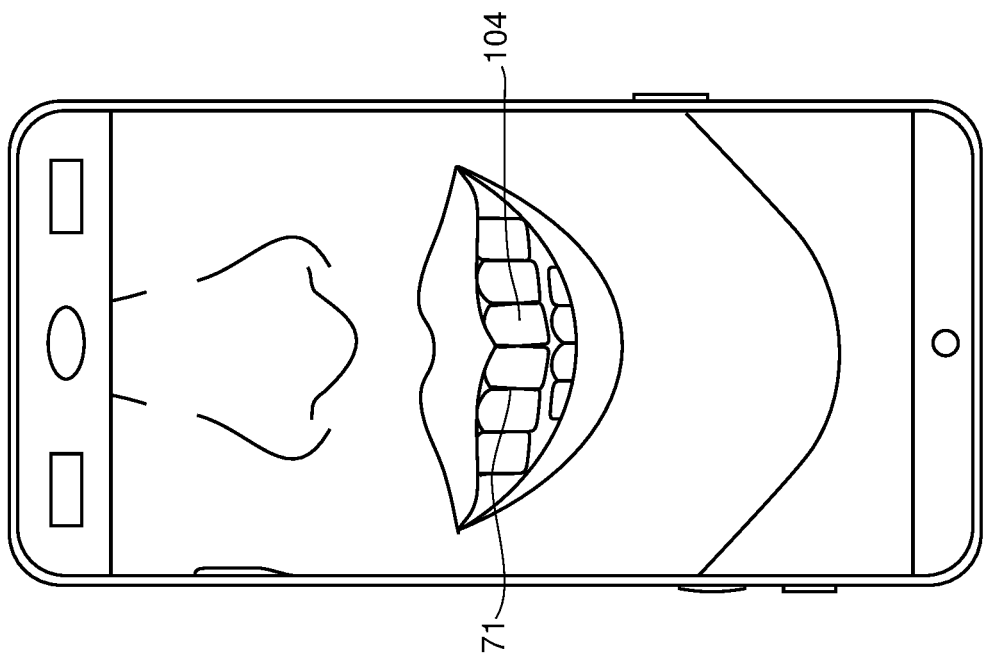

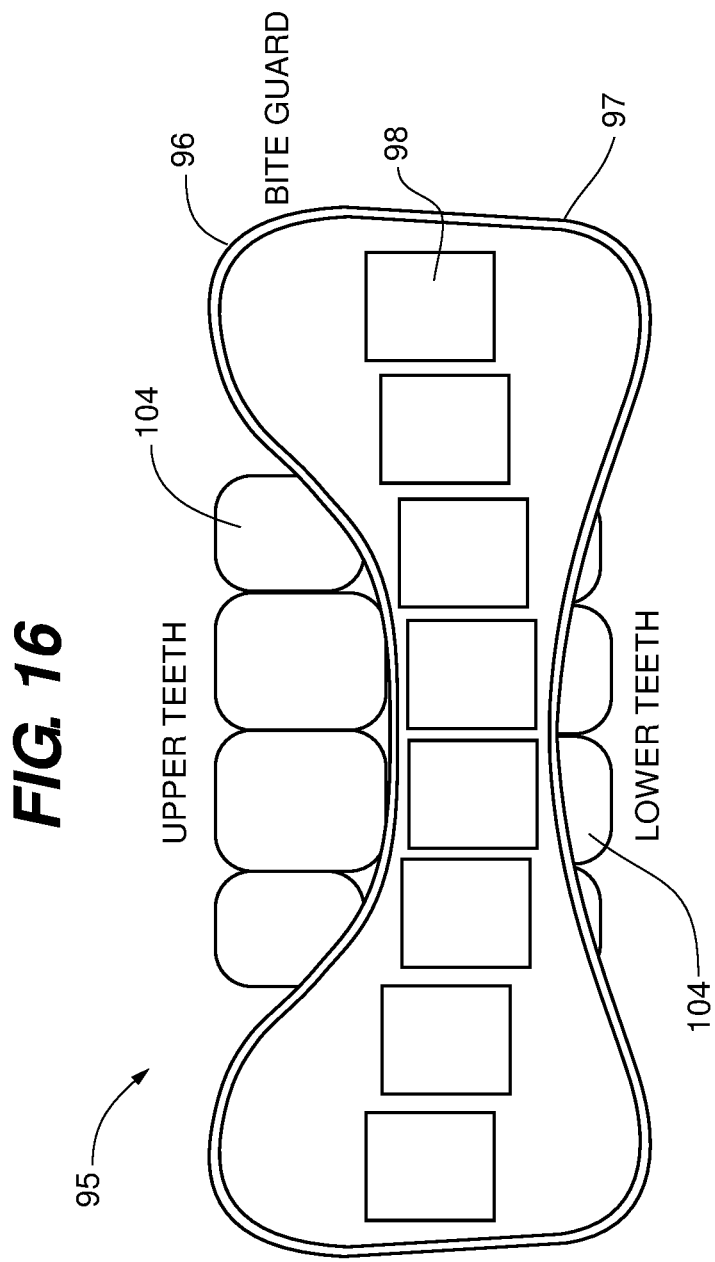

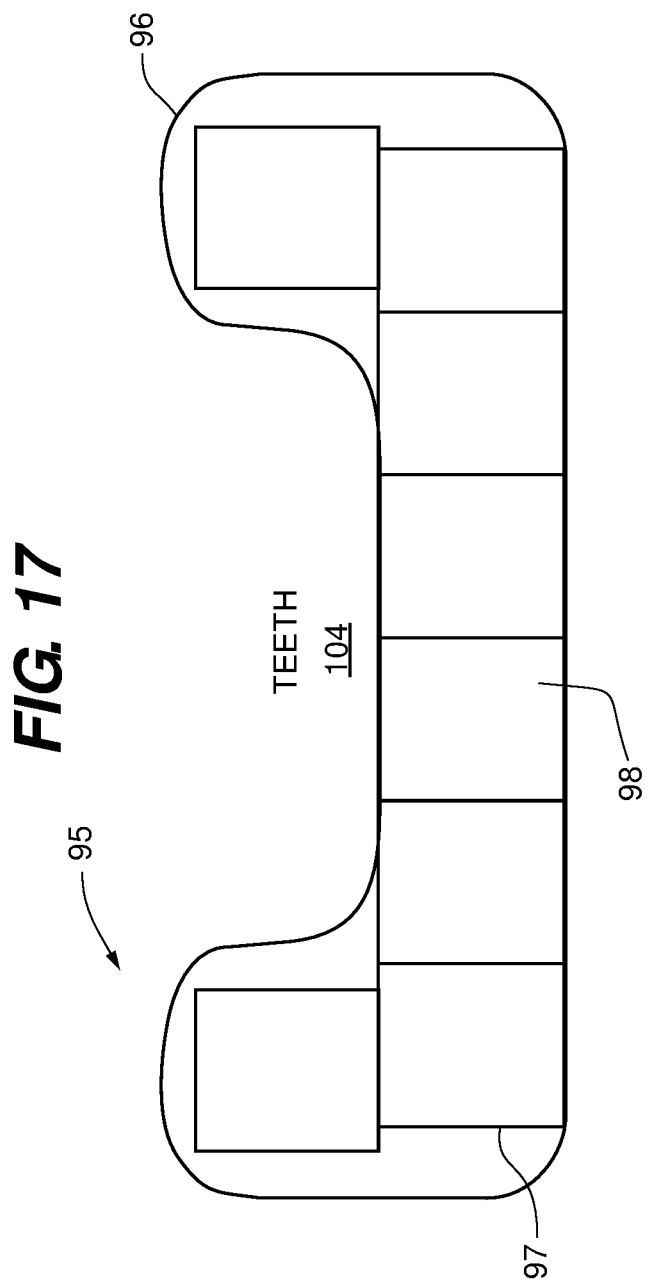

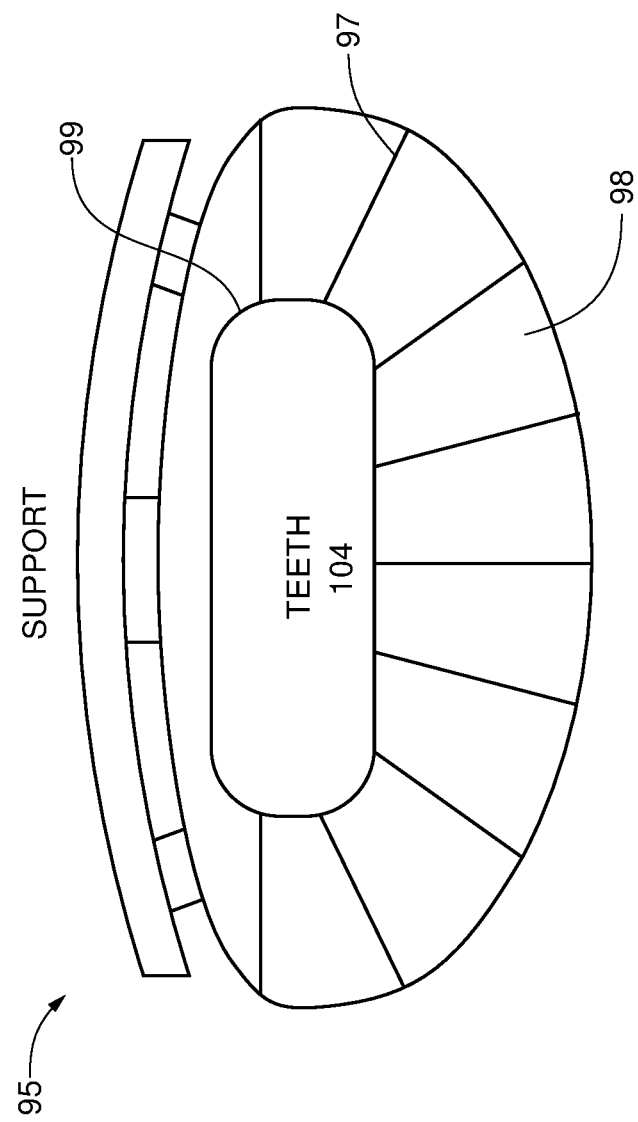

BODY PART COLOR MEASUREMENT DETECTION AND METHOD

FIELD OF THE INVENTION

The present disclosure is directed to a method of detecting an accurate color measurement of a body part, such as teeth, through the strict control of both ambient and direct lighting sources. In one embodiment, a user is guided through the method using a hand held personal computing device having a lighting source of a known color and a camera of known color acquisition characteristics. By careful control of lighting and image acquisition, the relative whiteness of a user's body part in the form of a whiteness score or percentage can be determined.

SUMMARY

As indicated above, embodiments of the present disclosure are directed primarily to a computer based application or "app" such as may be utilized by smart phones or similar portable computing devices equipped with a camera. The app of the present disclosure provides guidance in the form of direction for controlling all lighting sources and carefully controlling image acquisition in order to measure the color of a desired region of a user's facial anatomy, such as their teeth.

Because facial anatomy includes several amorphous angulations, with less than distinct margins relative comparisons of anatomical color are difficult. Inconsistent ambient lighting, distance from a camera to the user, angle of the camera, etc. all act to make consistent and objective image comparisons of color and color quality nearly impossible without the techniques described herein. When utilized in the manner discussed and described herein, the method of the present disclosure overcomes these known limitations and provides lighting instructions, a lighting source, an image acquisition mechanism, and image acquisition instructions in a mobile solution for determining the color of facial anatomy using standardized metrics.

The method utilizes operations to standardize various aspects of the image detection and capture process including standardizing the level of ambient lighting during image detection, establishing a set distance and angulation of the camera relative to the user, providing mechanisms to clearly outline and differentiate the desired facial anatomy (teeth) of interest from adjacent areas. The captured image of the user's teeth is then measured and analyzed by the application to provide a whiteness score that may be compared to other users' whiteness scores and/or one's own scores over time.

BRIEF DESCRIPTION OF THE DRAWINGS

FIGS. 5-12 are close-up views of the display of the electronic device being used in the process depicted in FIG. 2 and illustrate the subsequent steps of the process.

FIG. 16 is a front view of a color chart apparatus for use as an alternative or to supplement the step of obtaining an initial image in a darkened room as shown in FIGS. 3-4.

FIG. 17 is a front view of an alternative embodiment to the color chart apparatus shown in FIG. 16.

FIG. 18 is a front view of an alternative embodiment to the color chart apparatuses shown in FIGS. 16 and 17.

DETAILED DESCRIPTION

The present invention is a method involving mechanical steps which allow a user to create a controlled environment for capturing an image and subsequently calculating a color/brightness score of a portion of a user's anatomy. The invention provides steps to control ambient lighting and camera distance from a user in order to create a reproducible environment for image capture.

In one embodiment, the portion of the user's anatomy of which a color score is to be obtained is the user's teeth. The embodiment is described herein, but the methods described are applicable to other embodiments as well, such as: for determining a score of a user's skin or of cosmetics applied thereto, the determination of a color score of an anatomical feature such as a mole or blemish, determining a color score for a user's hair, etc.

Figure 1:
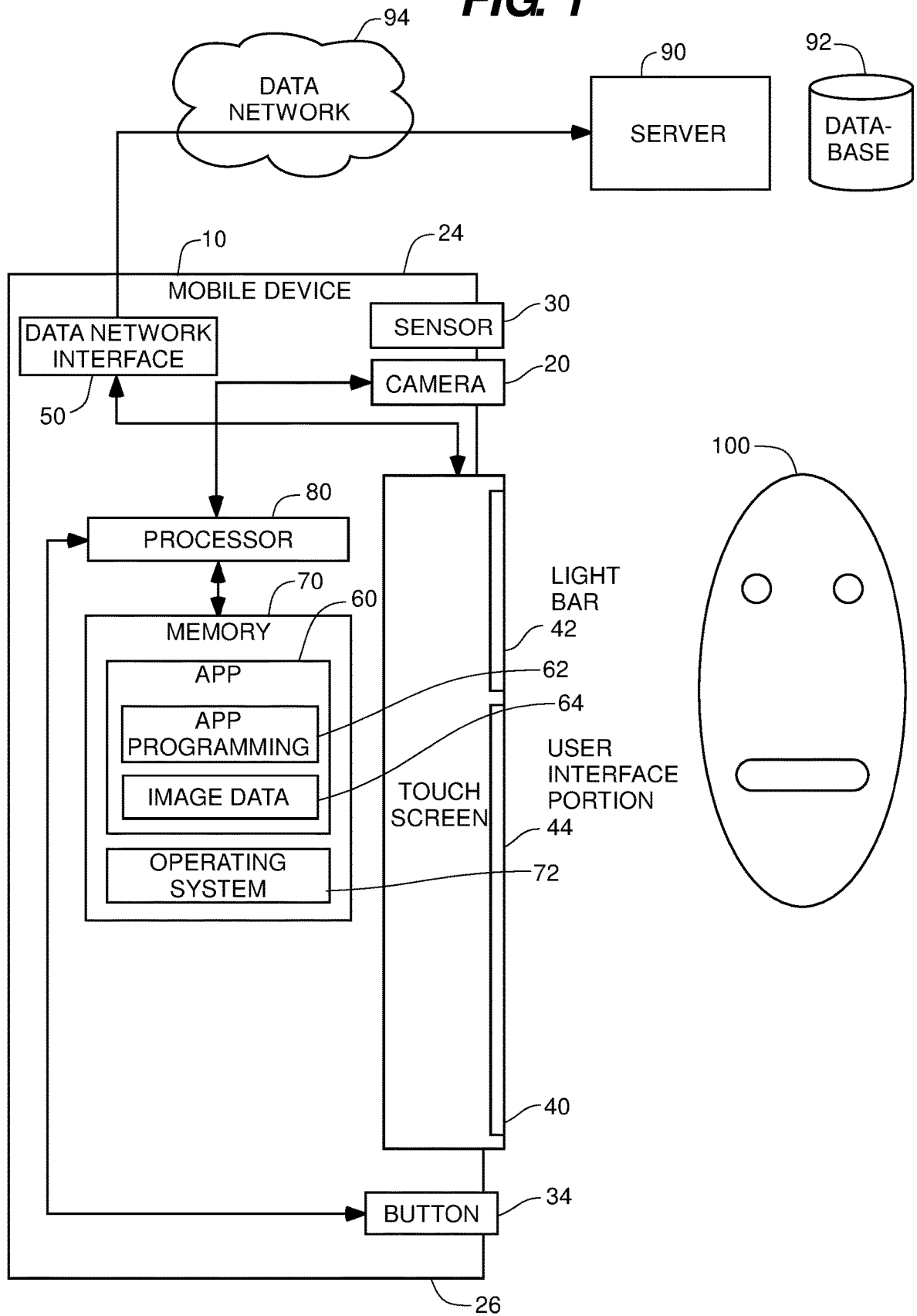
FIG. 1 is a flowchart showing the components of an embodiment of the system.

One embodiment makes use of a computer program or application (app) stored in the electronic memory of a portable electronic device 10 in order to control the method. As is shown in FIG. 1, the device 10 can take the form of a smart phone that is equipped with a camera 20, a user interface or touch screen 40 that performs multiple functions in this embodiment, and network connectivity 50 to allow the portable electronic device 10 to connect with a remote server 90 and its associated database 92 over a wide area network 94, such as the Internet. The application 60 resides on the memory 70 of the device 10. The application 60 generally takes the form of computer instructions 62 that are designed to be executed on a computer processor 80. In one embodiment, the processor is an ARM-based processor developed pursuant to the specifications of Arm Holdings of Cambridge, UK. The application 60 may also contain data 64, such as image data created by the app 60. In some embodiments, the app 60 only temporarily stores data 64 within the device 10, with the intent of the primary data storage of images created by the app 60 being the database 92 accessed through server 90. In order for the device 10 to function as a smart phone and perform other functions, the memory 70 will contain programming that provides the operating system 72 of the device, such as the iOS from Apple Inc. (Cupertino, Calif.) or ANDROID OS from Google Inc. (Menlo Park, Calif.).

In function and use the application 60 guides the user through a process that allows the user to detect, measure and display the color or color value of any particular area of facial anatomy, such as for example the whiteness of a user's teeth in the form of a percentage value or score. The app 60 will provide instructions to the user 100 to perform the appropriate steps of the method through the touch screen 40. In one embodiment, the app 60 will divide the screen 40 into two portions. A first portion 42 is proximal to the camera 20 and is used to provide a consistent light source near that camera. This is accomplished by providing a rectangle of light (a "light bar") 42 on the touch screen 40. Because the app 60 has the ability to control the content of the touch screen, the intensity and the color of the light bar 42 can be adjusted to ensure a consistent image of the user's facial feature. The light bare 42 is adaptive to the size of the device's screen size, and screen ratio and configured to emit the correct quality of light (and quantity) in terms of color temperature and lumenosity therefrom.

The second portion 44 is the user interface portion, which will provide written and video instructions for performing the method, and to provide an image of what the camera 20 is viewing at a particular time. In circumstances where an image is not about to be acquired, the light bar 42 can be removed from the screen 40 to allow the entire screen to be used for the user interface 44.

Before the application can provide the whiteness score of a user's teeth, the phone 10 and the application 60 must be calibrated so as to provide imagery of a consistent quality so that the relative whiteness score is measured from a relatively stable and constant baseline of environmental conditions. The calibration process 400 is set forth in the flowchart found on FIG. 2. This method 400 will be presented in the context of the elements of FIG. 1 and the general use illustrations shown in FIGS. 3-12.

Figure 2:
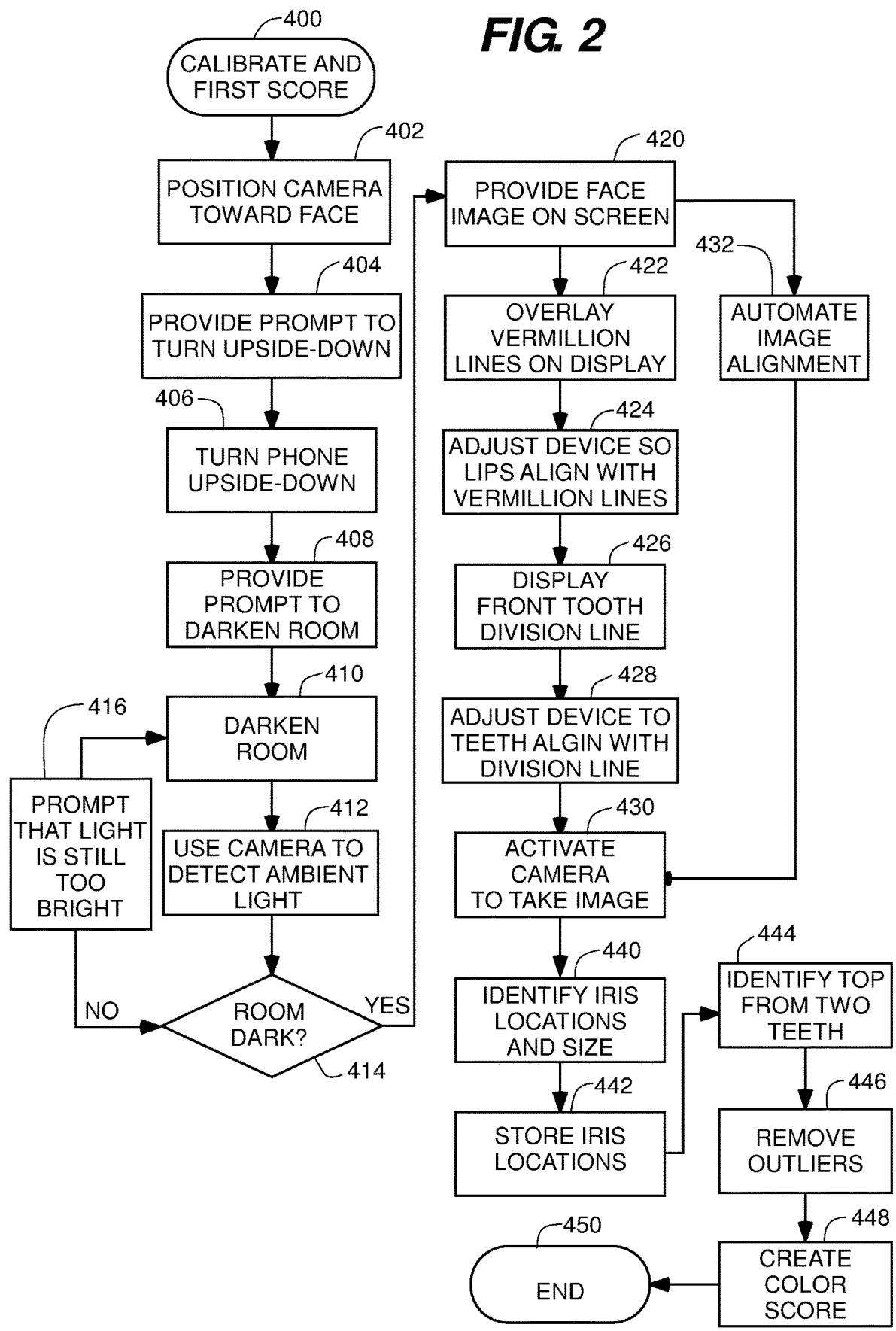
FIG. 2 is a flowchart showing the method of using the system of FIG. 1 for calibration of an electronic device and providing an initial color score to a user.
Figure 3:
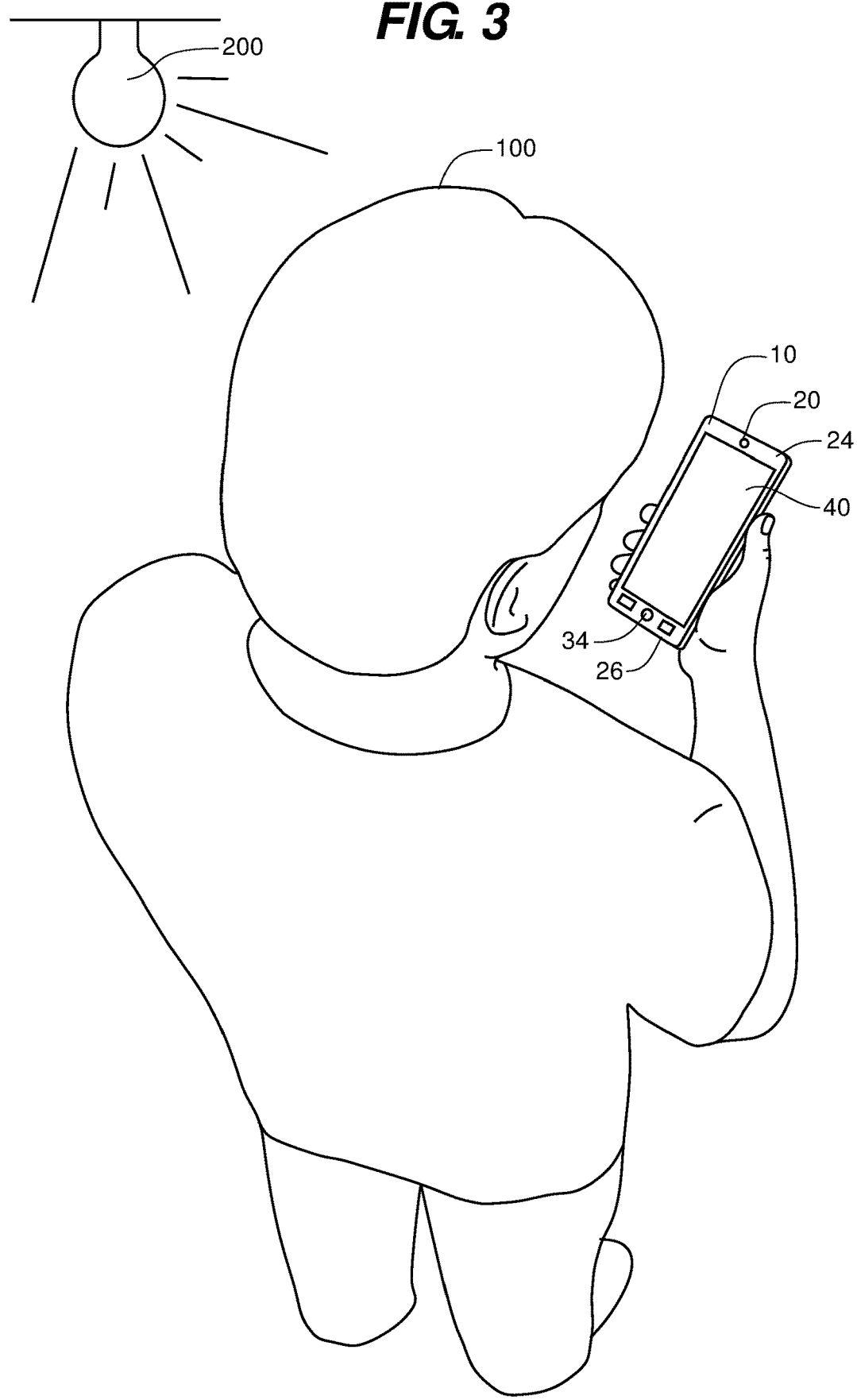
FIG. 3 is an environmental view of the manner in which a user begins the process shown in the flowchart depicted in FIG. 2.

The method begins with the user 100 holding the phone 10 in front of their face so that the user-side camera 20 is able to detect and display a real time image of the user's face on the display screen 40, such as in the manner shown in FIG. 3 and represented in step 402 of the operational flowchart of FIG. 2.

Most smart-phones, such as phone 10 shown in FIG. 3, have a top 24 and a bottom 26 with such relative terms being applied from the perspective of the user. In the embodiment shown in FIG. 3, the phone 10 includes the camera 20 (lens), and other elements ubiquitous to phones such as a speaker, etc. Proximal to the bottom 26 of the phone 10 is a user control or home button 34.

Figure 4:
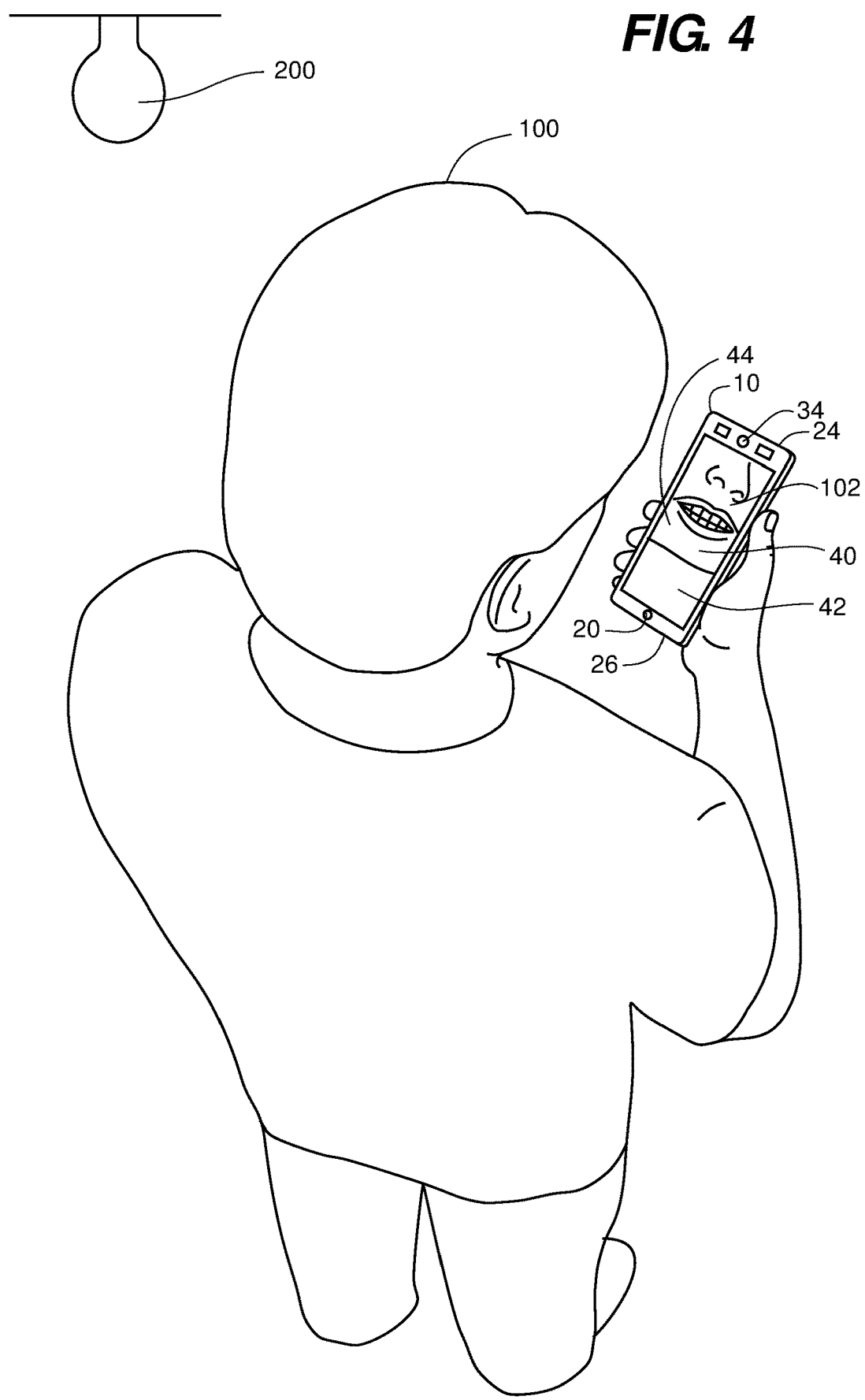
FIG. 4 is an environmental view depiction a subsequent step of the process begun in FIG. 3.

As part of the calibration process, as represented in block 404 of the operational flowchart of FIG. 2, the application will provide an audio and/or visual prompt to appear on the screen 40 for the user to turn the phone 10 "upside down" or to "turn the phone over 180 degrees", etc. so that the camera 20 is now positioned at the bottom 26 of the phone from the perspective of the user 100, such as in the manner shown in FIG. 4 (step 406 of FIG. 2). In this position the camera 20 is better positioned to detect and display an image of the user's face on the screen 40. The application 60 will display the image of the user's face 102 on that portion of the interface portion of the screen 40. Note that the user's face will appear "right side up" on the display screen 40 despite the camera 20 being inverted.

In some embodiments the application is in communication with the internal gyroscope or other orientation mechanism of the phone so as to measure the tilt of the phone or device 10. When the user's face 102 is properly positioned within the confines of the user interface 44 the application may record the tilt of the device upon initial image capture/calibration and utilize that recorded tilt in future image capture processes (see FIG. 13) to ensure that the user's face is properly aligned with the device 10.

At this point in the calibration process, the application will also prompt the user 100 to make sure to "turn off all the lights in a room" or to "go into a darkened room", etc. As illustrated in FIGS. 3 and 4, light source 200 is turned off to properly obtain and display the image of the user's face 102 on the screen 40.

Instead of relying on the impossible to predict or control ambient light of a given environment, the calibration process relies instead on the light emitted from the screen 40 to illuminate the user 100 in order to obtain and display the image of the user's face 102.

When obtaining the image 102, the phone 10, via the application programming 62, creates a partial screen 44 on the display 40, which that shows the subjects face; with a residual screen 42 acting as a predetermined light emission source. An example of the application providing the partial screen 40 and residual screen (light source) 42 on the display screen 40 of the phone 10 is shown in FIG. 4. The residual screen 42 is illuminated to emit lighting of a specific color temperature. By varying the R G B values of individual pixels, and the intensity of the pixel emission, a variety of source light temperatures are possible.

In some embodiments, the phone 10 will have one or more light sensors 30 (see FIG. 1). If the ambient illumination (light that the phone is exposed to from light source 200 or other environmental light sources, even when such sources are minimized or turned off) that the phone 10 is exposed to exceeds an application determined limit, the application will place a prompt on the display screen 40 (and/or provide and audio indication) that the light level is too bright to proceed with calibration and the calibration process will be placed on hold until the ambient light level is below the required threshold.

The above process of prompting the user 100 to go to a darkened room in order to provide consistent illumination of the user's face, and obtain an image thereof, using the camera 20 and light sensor 30 as well as the illumination provided by the residual screen 42 is depicted in steps 408, 420, 412, 414, 416, and finally 420 of the flowchart shown in FIG. 2.

To standardize distance between the camera 20 and the target (the face of the user 100), the user 100 will position his or herself in such as manner so as to align his/her upper vermillion border 52 and lower vermillion border 54 (i.e. lips) within a schematic outline or "guide lines" 56 that the application superimposes graphically upon the display screen 40 during the image capture process such as in the manner shown in FIGS. 5 and 6, and at process steps 422 and 424 of the flowchart shown in FIG. 2. The application may prompt the user to "smile" before or during this step. In some embodiments, the upper vermillion border may consist of a specific anatomical shape contiguous with the philtrum (i.e. the region between the nose and upper lip of the user).

In addition to aligning the upper vermillion border 52 and lower vermillion border 54 within guide lines 56, preferably while the user is smiling or otherwise exposing at least some of their teeth, in at least one embodiment the user 100 will also align the line or gap 58 between of his/her central incisors with a superimposed mid-line 59 that the application also graphically produces on the display screen 40 such as in the manner shown in FIG. ban, and at steps 426 and 429 of the flowchart shown in FIG. 2.

Once the lips and teeth are properly aligned and in place within the superimposed graphics 56 and 59, the user may activate the camera to capture the image of the user's face 102 in accordance with step 430 of the FIG. 2 flowchart. The image 102 may also be automatically recorded by a computer utilizing facial recognition technology, such as is represented by block 432 of the flowchart shown in FIG. 2. The distance between the upper and lower vermillion border, along with the midline and its angulation is fixed as is the distance between the user and the device.

As shown in the sequence of steps illustrated in FIGS. 7-10, and at blocks 440 and 442 of the FIG. 2 flowchart, following capture of the image 102, the user 100, using the touch screen interface functionality of the display 40 via their finger, stylus, mouse, or by automatic detection provided by the application, marks the location of the iris 65 of the left eye 66 and then right eye 67 of the user's face as shown in the captured image. The act of marking the irises may be done by encircling the respective areas of the eyes with a graphical indicator (e.g. a drawn circle) 68 that the application superimposes onto the display 40. The indicator 68 is moved, as well as enlarged or reduced as necessary, via the graphical interface of the display 40 such as by common interface commands applied by contact with the interface with the user's finger, stylus, etc. to be placed over and fully encircle each iris such as in the manner shown.

By identifying the precise position of the two eyes 66 and 67, and the upper vermillion borders 52 and lower vermillion borders 54, and the midline 59, the user's position and distance for all future measurements are locked in three dimensions.

Regarding the application's use of the irises 65 of the eyes 66 and 67 to act as markers of the user's fascial anatomy for calibrating the distance and position of the user's face 102 relative to the device 10; it should be noted that the use of the irises 65 in this manner is but one potential distinct bilateral markers that could be utilized be the application for this purpose. In some embodiments for example, features such as a user's nostrils, ears, other aspects of the eyes, etc. could be used provide such a bilateral marker to act as a reference for the application.

Once the captured imaged is locked in this manner the application stores the graphical indicators 68 representing the location of the users' irises 65, and their position relative to the guide lines 56 and mid-line 59 into device 10 memory 60 as a calibrated profile or reference that can be used in subsequent image capture processes as will be described below.

The user is then prompted by the application to use the interface functionality of the screen 40 to "zoom in" onto the image of the teeth 104 that had been framed within the guide lines such as in the manner shown in FIG. 11. The application will prompt the user to "draw" or trace on the screen with a finger or stylus, so as to place an outline 71 around the front teeth of the image 102, such as in the manner shown in FIG. 12 and at process step 444 of FIG. 2. The outline 71 is a graphically created line superimposed onto the image 102/104 which follows the tracing of the user's finger, stylus, etc. on the screen 40. By sufficiently zooming in on the desired area of the teeth 104 the outlining of the teeth is made far easier, even when done by tracing the teeth with a finger along the screen. The application allows the user to place the graphical outline 71 on individual teeth or multiple teeth together.

The pixel content of the outlined teeth 104 as defined by the outlined area or areas 76 and 78, shown in FIG. 12, is sent to the server 90 and database 92 (via the interface 50 and network 94) by the application. At process step 444, via statistical analysis such as is described in U.S. Pat. No. 9,478,043, the entire contents of which are incorporated herein by reference, the pixels are filtered and glare is removed; and a whiteness or color score is calculated.

Following these calculations, the server 90, at step 448 shown in FIG. 2, communicates with the application 62 to provide the color score, which is displayed on the user interface portion 44 of the device display 40. The color score is derived from an examination of the color value (such as R-G-B color values) of the pixels within the outlined area or areas 76 and 78, wherein pixels that vary greatly from the typical value within the area(s) are discarded as outliers. The processor/application develops an average color value for the remaining pixels, and applies an algorithm to develop a 1-100 score which is the color score displayed to the user. Once this score is displayed, at step 448, the application ends the process at step 450 after a preset period of time displaying the score or upon an input from the user. In some embodiments, the application may provide a visual prompt on the interface 44 to encourage or allow the user to restart the calibration process, obtain another score, or close the application.

Ideally multiple phones, and their associated applications are linked to the central server 90. In some embodiments, the server/individual applications can compare a given user's color score or scores with those of other users, and return a normalized percentile score compared to other users. Historical values for a given user can be compared with the most recent color score obtained in order to determine and track any improvement in a user's color score.

In some embodiments, a user's color score or stored imagery may be used to trigger the provision of diagnostic information and/or product recommendations that the server and application will display on the interface 44 following a prompt or automatically. In at least one embodiment the application will provide a prompt or inquiry message to appear on the screen 40 which asks if the user had been using a product in association with the score being provided.

Figure 13:
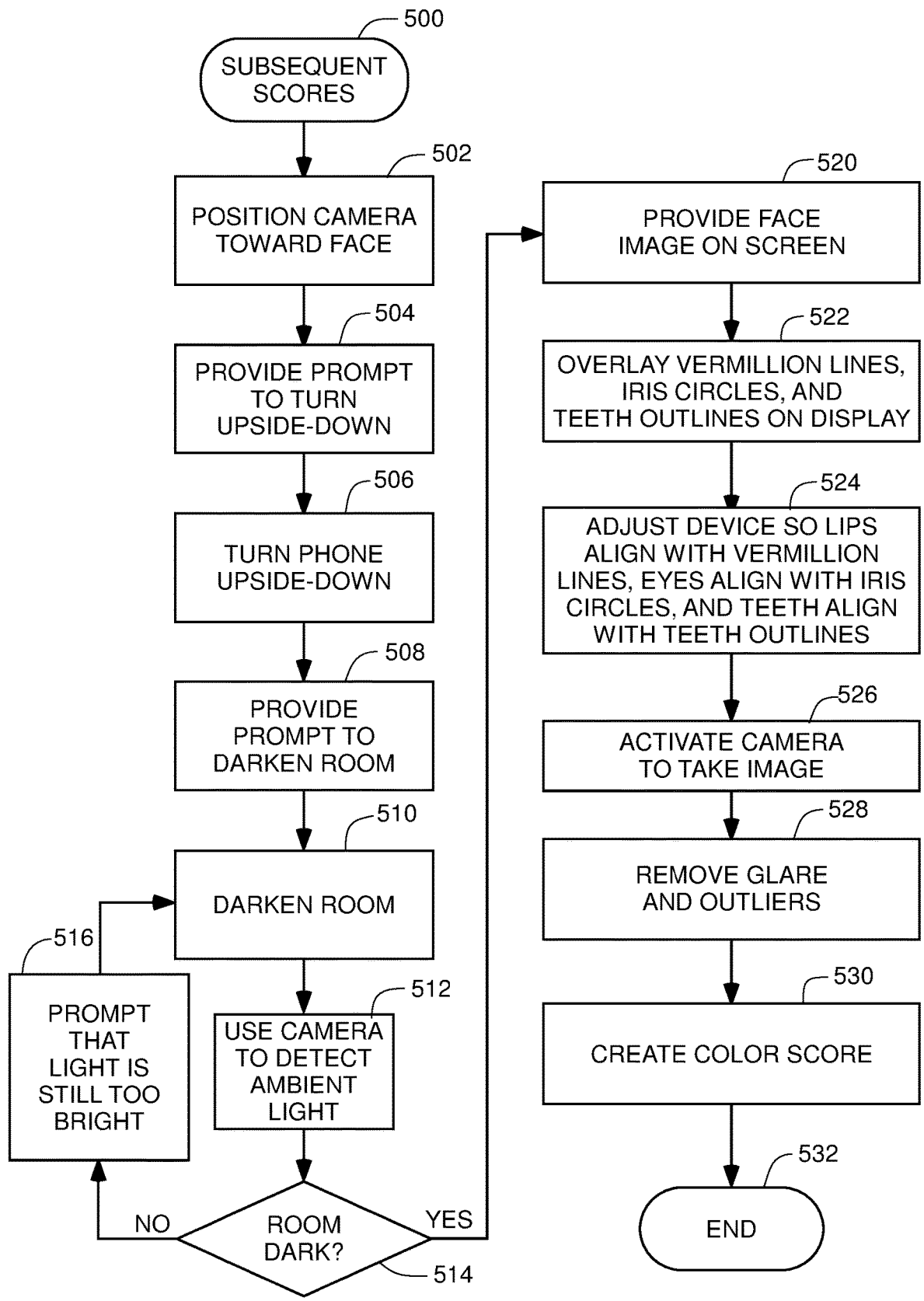
FIG. 13 is a flowchart showing the steps of acquiring images of a user's teeth as well as obtaining color scores thereof using a stored calibration profile.
Figure 15:
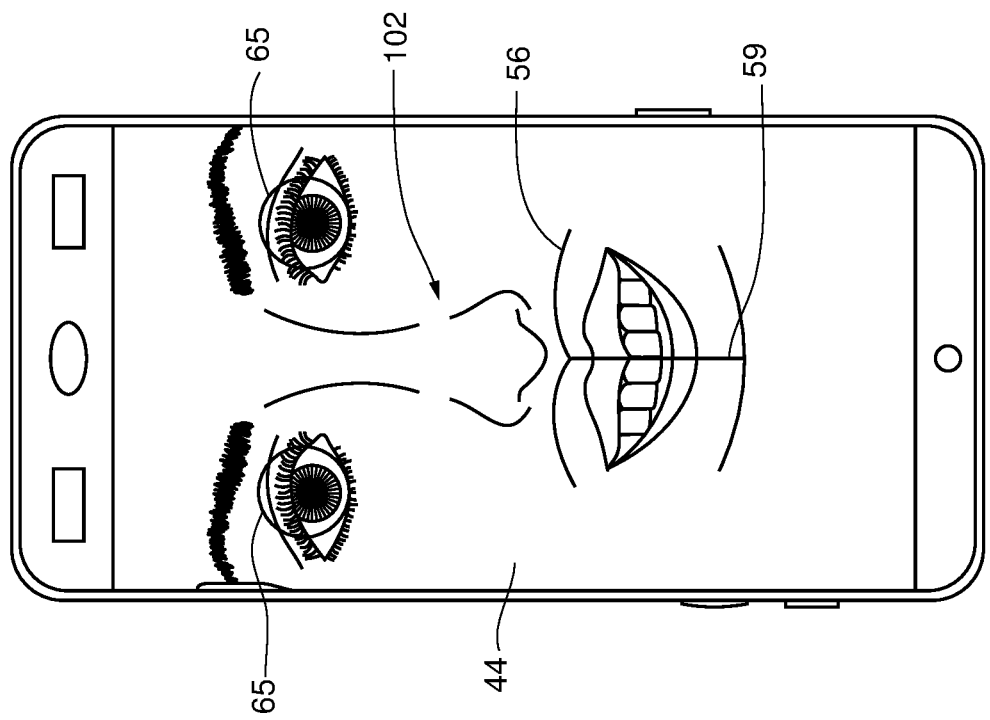
FIG. 15 is a close-up view of the display of the electronic device shown in FIG. 14 wherein a user is shown positioning their face on the screen in using the stored calibration profile as a visual guide and in accordance with the steps put forth in the method depicted in FIG. 13.
Figure 14:
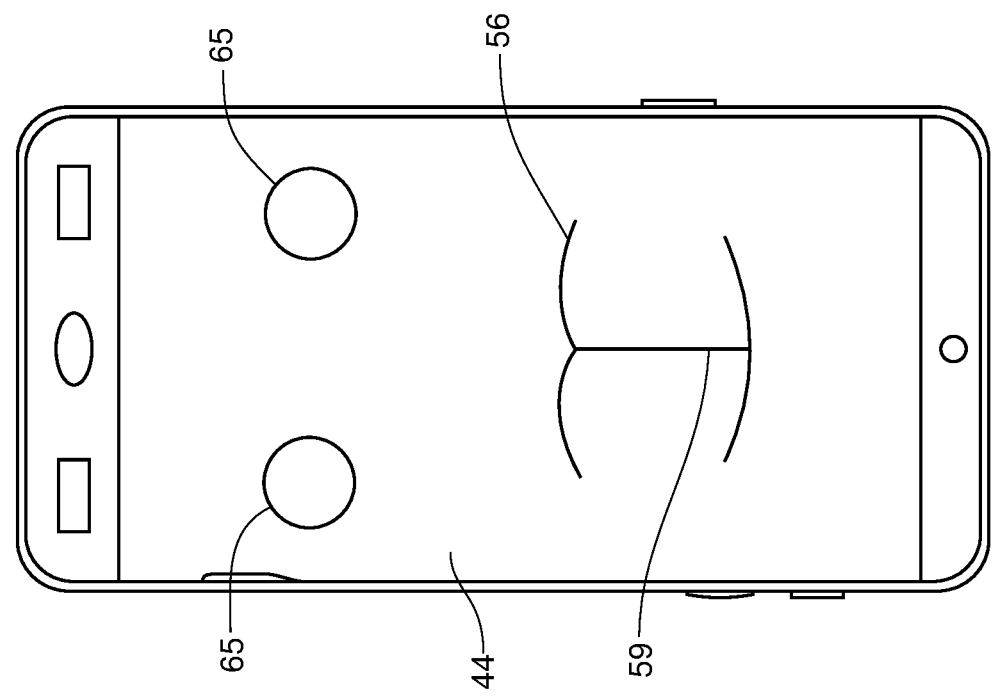
FIG. 14 is a close-up view of the display of the electronic device with a the graphical components of a stored calibration profile superimposed on the user interface.

The application 60 is configured to store the calibrated profile obtained by following the calibration process depicted in FIG. 2. At a later time, post calibration, the user may perform a separate image capture process, of which its steps 500-532 are depicted in FIG. 13, to determine their color scores over time without having to recalibrate the application again. This second (and/or any subsequent capture) will follow much of the procedure described above, but will utilize the user's stored vermilion, iris and mid-line positions, depicted by their representative graphically superimposed outlines 56, 59 and 65 that the application will store and then subsequently present on the interface 44 during the subsequent image capture process (step 522) such as in the manner shown in FIG. 14. These guidelines are provided, along with prompts provided by the application, and displayed on the interface 44 and/or via the phone's speaker (not shown) to guide the user to properly position their face 102 within the frame of the display screen 40 provided by the phone's camera 20 in the manner shown in FIG. 15. When the user's face is properly positioned relative to the recorded facial feature positions shown on the display 40 (see process steps 522 and 524), the photo is taken (step 526) and the subsequent image is captured, stored and processed in the manner previously described.

Subsequent images may then be compared to one another and to the original calibration image so as to note progress of a teeth whitening process over time, note the possible development of deterioration such as may be caused by cavities or tooth decay, or simply note the condition of one's smile over time.

Turning now to FIGS. 16-19 wherein 4 embodiments of a color chart apparatus or "color card" 95 are shown. A color card may be utilized in situations wherein the user 100 is unable to provide a sufficiently dark environment to proceed with initial image capture and calibration such as is discussed in regards to FIG. 3-4 above. In such an instance a color card 95 such as is shown in FIG. 16-19 may be utilized to allow the application 60 to proceed with image capture and calibration despite the presence of excess environmental illumination.

In the embodiments shown in FIGS. 16-18 the color card 95 is provided in the form of a mouth guard 96 that has colored blocks or other areas 97 of specified and known color values 98 which are held adjacent to the anatomy which a color score is desired (in this case teeth 104). The colored areas 98 are preferably based on a CMYK color model, but alternative models may be utilized as well as long as the application is configured to compare the known values of the colored areas 98 to the colors of the image obtained with the color card present.

In the embodiment shown in FIG. 16 the mouth guard 96 is configured as a member which the user 100 bites down upon such that the areas 97 are within the view of the camera 20 (see FIGS. 3-4) during initial image capture as shown and described above. In an alternative embodiment, shown in FIG. 17, the mouth guard 96 is shaped such that only the upper teeth 104 of the user are shown when the mouth guard is in place. In another embodiment, shown in FIG. 18, the color card 95 is configured as a lip support (as opposed to a mouth guard per se) that is positioned behind the lips of the user but in front of the teeth 104, and opening 99 within the card 95 allows the teeth 104 to be exposed when the card 95 is properly positioned.

Figure 19:
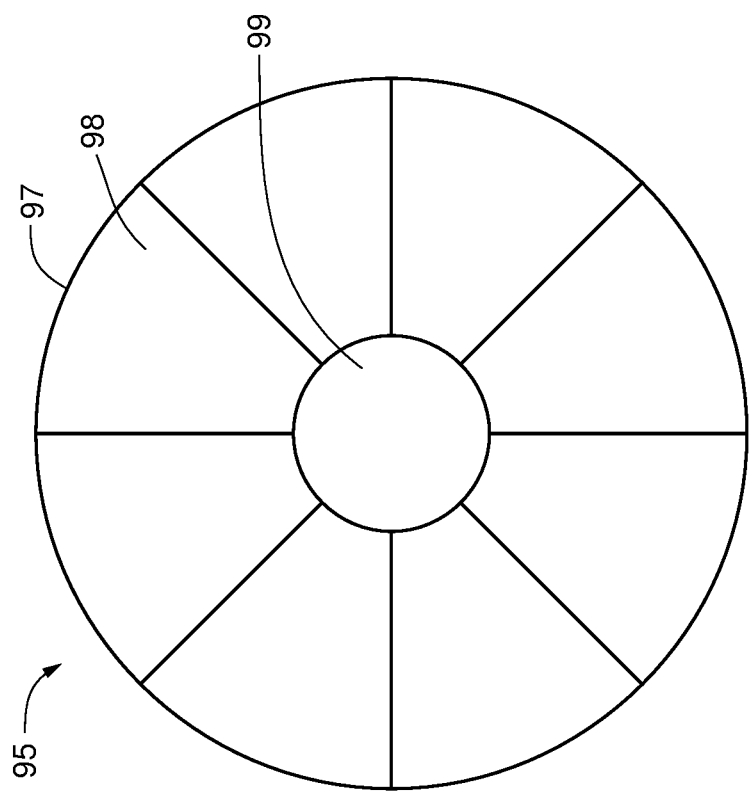
FIG. 19 is a front view of an alternative embodiment to the color chart apparatuses shown in FIG. 16-18.

Finally, in FIG. 19, a universal manually positionable card 95 is shown, which consists of the card 95 with a hole 99 centrally positioned therein and surrounded by the colored areas 97. The card 95 is sized to allow a user (not shown) to simply hold or place the card 95 over any desired part of the anatomy to which a color score is desired. While the teeth of the user may be scored using this configuration of the color card 95, this configuration is more ideal for imaging and scoring the skin (e.g. analyzing the degree of a tan obtained or pigment changes of a mole, etc.) or hair (e.g. to determining the effectiveness of a hair coloring product).

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method of using a portable electronic device having a camera and a display screen with a user interface, to provide a color score for a user's teeth, the method comprising:
    a) activating an application stored on an electronic memory of the portable electronic device, the application prompting the user to:
       1) turn the portable electronic device upside down, and
       2) enter a darkened room;
    b) illuminating a portion of the display screen such that the portion emits a light of a predetermined color temperature;
    c) using the camera function, capturing an image of the user's face with at least some teeth exposed, wherein the user's face has been aligned with a first graphical reference superimposed on the user interface by the application;
    d) displaying on the user interface the image of the user's face and graphically marking the location of the user's irises with a second graphical reference superimposed on the user interface by the application;
    e) graphically surrounding a desired pixel content area of the user's teeth on the image of the user's face with a third graphical reference superimposed on the user interface by the application;
    f) using a data network interface of the portable electronic device, the application transmits the pixel content area to an external server and database, programing on the external server calculates a color score for the pixel content area and then transmits the calculated color score back to the portable electronic device, the application displays the calculated color score on the user interface.

2. A method of using a portable electronic device having a camera and a display screen with a user interface, to provide a color score for a user's teeth, the method comprising:
    a) activating an application stored on an electronic memory of the portable electronic device, the application configured to provide and display prompts to the user on the user interface, the application activating the camera so as to display a real time image of the user on the user interface, the application prompting the user to:
       1) turn the portable electronic device upside down, and
       2) enter a darkened room;
    b) illuminating a portion of the display screen such that the portion acts as a light source which emits a light of a predetermined color temperature;
    c) superimposing upon the user interface application created graphics, the graphics comprising a pair of guide lines and a mid-line, the application prompting the user to:
       1) position the user's lips between the guidelines, and
       2) to align a gap of the users two front teeth along the mid-line;
    d) aligning the lips of the user between the guidelines and aligning the gap of the user's front teeth along the mid-line shown on the user interface to provide an aligned image of the user's face;
    e) activating the camera to capture the aligned image of the user's face;
    f) replacing the real time image of the user with the captured image of the user's face on the user interface;
    g) superimposing upon the captured image, application provided graphics, the graphics comprising two moveable and size adjustable circles, the application prompting the user to:
       1) locate the iris of each eye in the captured image, and
       2) place a circle over each iris;
    h) the application storing within the electronic memory of the portable electronic device, the position of the circles and the position of the guide lines and mid-line relative to the circles on the user interface as a calibrated profile;
    i) the application prompting the user to:
       1) zoom in on the teeth of the captured image, and
       2) use a finger to trace on the user interface an outline around the two front teeth;
    j) superimposing upon the captured image, an application provided graphic of a line corresponding to a path that follows the users finger, an area enclosed by the line defining a pixel content area;

k) using a data network interface of the portable electronic device, the application transmits the pixel content area to an external server and database, the programing on the external server calculates a color score for the pixel content area and then transmits the calculated color score back to the portable electronic device, the application displays the calculated color score on the user interface.

3. The method of claim 2, wherein the portable electronic device is a smart phone.

4. The method of claim 2, wherein the portable electronic device includes a light sensor, the application via the light sensor detecting if ambient light is above a threshold value, as long as ambient light is above the threshold value, the application providing a prompt to the user that the light level is too bright.

* * * * *